US008887039B2

(12) United States Patent
Xu et al.

(10) Patent No.: US 8,887,039 B2
(45) Date of Patent: Nov. 11, 2014

(54) WEB PAGE BASED PROGRAM VERSIONING

(75) Inventors: Zhenbin Xu, Sammamish, WA (US);
Alex Mogilevsky, Bellevue, WA (US);
Markus W. Mielke, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1643 days.

(21) Appl. No.: 11/968,624

(22) Filed: Jan. 2, 2008

(65) Prior Publication Data
US 2009/0172519 A1 Jul. 2, 2009

(51) Int. Cl.
*G06F 3/00* (2006.01)
*G06F 17/30* (2006.01)

(52) U.S. Cl.
CPC .................. *G06F 17/30905* (2013.01)
USPC .................. 715/229; 715/234; 715/273

(58) Field of Classification Search
CPC ............... G06F 3/14; G06F 17/30861; G06F 17/30867; G06F 17/30899; H04L 67/42; H04N 21/2355; H04N 21/431; H04N 21/8402
USPC .................. 715/200, 205, 229, 234, 273
See application file for complete search history.

(56) References Cited

U.S. PATENT DOCUMENTS

| | | | | |
|---|---|---|---|---|
| 5,949,419 A * | 9/1999 | Domine et al. | ............... | 715/744 |
| 6,212,536 B1 * | 4/2001 | Klassen et al. | ............... | 715/205 |
| 6,226,656 B1 | 5/2001 | Zawadzki et al. | | |
| 6,353,448 B1 * | 3/2002 | Scarborough et al. | ........ | 715/744 |
| 6,393,479 B1 * | 5/2002 | Glommen et al. | ............ | 709/224 |
| 6,433,794 B1 * | 8/2002 | Beadle et al. | ................. | 715/700 |
| 6,519,646 B1 | 2/2003 | Gupta et al. | | |
| 6,714,926 B1 | 3/2004 | Benson | | |
| 6,918,066 B2 * | 7/2005 | Dutta et al. | ..................... | 714/46 |
| 6,983,331 B1 * | 1/2006 | Mitchell et al. | ............... | 709/246 |
| 7,000,221 B2 * | 2/2006 | Bhogal et al. | ................. | 717/115 |
| 7,069,562 B2 | 6/2006 | Kushnirskiy et al. | | |
| 7,143,342 B1 * | 11/2006 | Baweja et al. | ................ | 715/207 |
| 7,254,526 B2 | 8/2007 | Aupperle et al. | | |
| 7,818,681 B2 * | 10/2010 | Abuelsaad et al. | ........... | 715/760 |
| 2001/0013043 A1 * | 8/2001 | Wagner | ......................... | 707/511 |
| 2002/0078262 A1 | 6/2002 | Harrison et al. | | |
| 2003/0028764 A1 * | 2/2003 | Campbell | ..................... | 713/156 |

(Continued)

OTHER PUBLICATIONS

Eichmann, "Evolving an Engineered Web", IEEE Computer Society, vol. 8, Issue 2, Apr. 2001, pp. 1-4.

(Continued)

*Primary Examiner* — Stephen Hong
*Assistant Examiner* — Gregory J Vaughn
(74) *Attorney, Agent, or Firm* — Andrew Sanders; Micky Minhas; Wolfe-SBMC

(57) ABSTRACT

An identification of one of multiple types of Web browsers that a Web page supports, as well as an identification of one of multiple versions of that one type of Web browser that the Web page supports, is obtained. The Web page is displayed using the identified version of the identified Web browser type. A request for an identification of the identified version of the identified Web browser type can also be received from a program, such as a Web page script. In response to the request, an identification of the identified version of the identified Web browser type is being used to display the Web page is returned, and instructions of the program are executed based at least in part on the identified version of the identified Web browser type.

20 Claims, 5 Drawing Sheets

(56) References Cited

U.S. PATENT DOCUMENTS

| | | | |
|---|---|---|---|
| 2003/0061283 A1* | 3/2003 | Dutta et al. | 709/204 |
| 2004/0025143 A1* | 2/2004 | Bhogal et al. | 717/115 |
| 2004/0258089 A1* | 12/2004 | Derechin et al. | 709/203 |
| 2005/0044232 A1* | 2/2005 | Keane | 709/227 |
| 2005/0149490 A1 | 7/2005 | Shapiro | |
| 2005/0246444 A1* | 11/2005 | Koehane et al. | 709/227 |
| 2006/0230344 A1* | 10/2006 | Jennings et al. | 715/522 |
| 2007/0271505 A1* | 11/2007 | Dandekar et al. | 715/513 |
| 2009/0006361 A1* | 1/2009 | Abuelsaad et al. | 707/5 |

OTHER PUBLICATIONS

"Web Page Development: Best Practices", Apple Inc. 2007, pp. 1-9.
"The Opera 9 DOCTYPE Switches", Opera Software ASA, 2007, pp. 1-3.
Orchard, "Achieving Loose Coupling", BEA Systems, 2007, pp. 1-4.

* cited by examiner

WEB PAGE BASED PROGRAM VERSIONING

BACKGROUND

The use of the Internet and World Wide Web (or simply the Web) has become commonplace throughout the world. Information is typically made available to users via Web pages that are retrieved from servers on the Internet and displayed on the users' computers using a program referred to as a Web browser. Different types of Web browsers authored by different companies currently exist, and as companies continue to develop their Web browsers and change the user interface and/or functionality of their Web browsers, new versions of these Web browsers are made available to users. The existence of these multiple versions of different types of Web browsers can be problematic because the authors of Web pages oftentimes design and test Web pages to work with a particular type and version of Web browser. Situations can thus arise where a Web page displays properly when displayed with one particular type and version of Web browser, but does not display properly when displayed with another version and/or type of Web browser.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects of the Web page based program versioning, an identification of one type of multiple types of Web browsers that the Web page supports is obtained. Additionally, for the identified one type of Web browser, an identification of one version of multiple versions of the identified one type of Web browser that the Web page supports is obtained. The Web page is presented using the identified one version of the identified one type of Web browser.

In accordance with one or more aspects of the Web page based program versioning, a request is made for an identification of a Web browser type and corresponding version that has been selected to display a Web page. In response to the request, an identification of the Web browser type and corresponding version that has been selected to display the Web page is received. One or more instructions of a program are executed based at least in part on the Web browser type and corresponding version that has been selected to display the Web page.

BRIEF DESCRIPTION OF THE DRAWINGS

The same numbers are used throughout the drawings to reference like features.

DETAILED DESCRIPTION

Web page based program versioning is discussed herein. Identifiers of one or more versions of each of one or more different types of web browsers that a Web page supports are obtained. When accessed at a computing device, the Web page is displayed using the particular version of the particular type of Web browser identified as being supported by the Web page. Additionally, scripts that are executed as part of the Web page can also access these identifiers and execute based on the particular version of the particular type of Web browser identified as being supported by the Web page.

Figure 1:
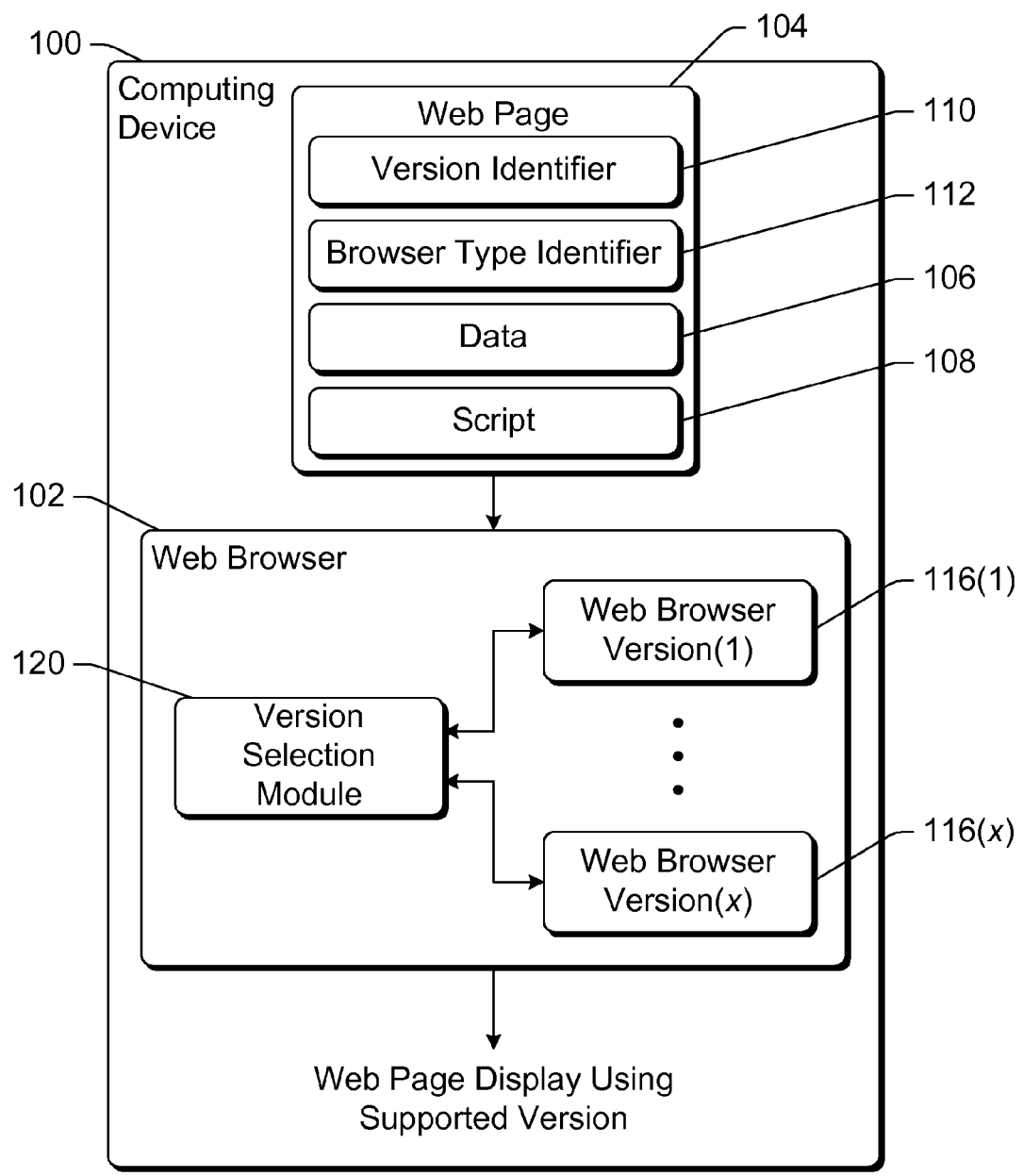
FIG. 1 illustrates an example computing device implementing the Web page based program versioning in accordance with one or more embodiments.

FIG. 1 illustrates an example computing device implementing the Web page based program versioning in accordance with one or more embodiments. A computing device 100 includes a Web browser 102. Web browser 102 is typically a software program executed by one or more processors of device 100, although Web browser 102 can alternatively be implemented in other manners. Device 100 can be any of a variety of different devices, such as a desktop computer, notebook computer, handheld computer, server computer, cellular phone, personal digital assistant (PDA), game console, automotive PC, and so forth.

Web browser 102 accesses a Web page 104 and displays or otherwise presents Web page 104 to a user of device 100. Web browser 102 oftentimes obtains Web page 104 from a server via the Internet. Alternatively, Web page 104 can be obtained in other manners, such as from a local cache of device 100, from another device operating on a same local area network (LAN) as device 100, from a proxy server or other intermediary cache, and so forth.

Web page 104 includes data 106 and optionally script 108. Data 106 includes the data that is displayed or otherwise presented by Web browser 102 as the Web page. Script 108 is a Web page script that is optionally included in Web page 104, and includes one or more instructions that are executed by Web browser 102 when displaying or otherwise presenting Web page 104. The instructions in script 108 can be obtained from the same server as Web page 104 is obtained, or alternatively can be obtained from another server or source. For example, Web page 104 can include a Uniform Resource Locator (URL) or other identifier of a location from which script 108 is to be obtained.

Web page 104 also includes a version identifier 110 and a browser type identifier 112. Browser type identifier 112 identifies a particular type of Web browser (also referred to as a particular user agent (ua)) that is supported by Web page 104. Different Web browser types refer to different Web browser programs, and can also optionally include hardware implementations of Web browser programs. Examples of Web browser types include Internet Explorer® available from Microsoft Corporation of Redmond, Wash., Firefox® available from Mozilla Corporation of Mountain View, Calif., Opera available from Opera Software of Oslo, Norway, and so forth.

A Web browser type being supported by Web page 104 refers to a Web browser type that the author of Web page 104 expects to be able to properly display (or otherwise present) Web page 104. Such an author typically tests Web page 104 with a particular Web browser type before indicating that the Web page 104 supports the Web browser type.

Version identifier 110 identifies a particular version of a corresponding Web browser that is supported by Web page 104, the Web browser being of the Web browser type identified by the browser type identifier 112. Different Web browser types can use different versioning schemes. For example, one version of Internet Explorer® could be 6.0, while another version of Internet Explorer® could be 7.0.

A version being supported by Web page 104 refers to a version of the Web browser that the author of Web page 104 expects to be able to properly display (or otherwise present) Web page 104. Such an author typically tests Web page 104 with a particular Web browser version before indicating that the Web page 104 supports that version.

Browser type identifier 112 and version identifier 110 are associated with one another, and together identifiers 110 and 112 identify a particular version of a Web browser type that is supported by Web page 104. Although a single browser type identifier 112 and version identifier 110 are illustrated in FIG. 1, it is to be appreciated that multiple such identifiers 112 and 110 can be included in Web page 104, indicating multiple particular Web browser type(s) and corresponding version(s) that are supported by Web page 104.

Web browser 102 is a particular Web browser type and includes multiple (x) different versions 116(1), ..., 116(x) of Web browser 102. Web browser 102 can include the different versions 116 as separate modules or components that can be invoked and executed as needed. Each of the different versions 116 is typically a different rendering engine of Web browser 102, each rendering engine operating in a different manner to present Web pages to a user of computing device 100.

Web browser 102 also includes version selection module 120. During operation, Web browser 102 accesses Web page 104. Version selection module 120 obtains both the version identifier(s) 110 and the corresponding or associated browser type identifier(s) 112 from Web page 104. Version selection module 120 is programmed with, or otherwise knows how to determine, the browser type of Web browser 102. Version selection module 120 is also programmed with, or otherwise knows how to obtain, the different versions 116 that are included in Web browser 102. Version selection module 120 accesses the version identifier(s) 110 corresponding to the browser type identifiers 112 that are the same type as the browser type of Web browser 102 to identify which version(s) of the Web browser is supported by Web page 104. The version 116 of Web browser 102, as identified by Web page 104, is then used to display the Web page. The version of the Web browser type used to display the Web page is thus based on the Web page itself because selection of the particular version is dependent on the version identifier 110 and browser type identifier 112 that are included in the Web page.

Situations can arise where multiple different version identifiers 110 for the same Web browser type are included in Web page 104. If multiple versions of the same Web browser type as Web browser 102 are identified by Web page 104, and those multiple versions are included as versions 116 in Web browser 102, then one of the identified versions is selected as the version to be used to display the Web page. In one or more embodiments, the most recent version that is both identified in Web page 104 and included as a version 116 in Web browser 102 is used to display the Web page.

Additionally, rather than specifying a particular version, version identifier 110 can be a "most recent" identifier. The "most recent" identifier indicates that the most recent version of the identified type of Web browser that is available on device 100 is to be used to display the Web page.

Furthermore, situations can arise where none of the versions identified by a version identifier 110 is included as a version 116 in Web browser 102. In such situations, version selection module 120 can select a default version 116 to be used to display the Web page. Alternatively, other actions could be taken, such as to display an error, to select a different Web browser type that is identified by a browser type identifier 112 and execute a Web browser of that type, and so forth.

In addition, a Web browser selection module can optionally be included in computing device 100. The Web browser selection module can be included as part of version selection module 120, or alternatively can be included as a separate module (not shown). Such a Web browser selection module obtains the browser type identifier(s) 112 for Web page 104 and launches or begins execution of a Web browser of the identified type. The Web browser can be executed in any of a variety of manners, such as sending a request to an operating system running on device 100 to begin execution of the Web browser. This executed Web browser, in turn, identifies which version of itself to use to display Web page 104 based on version identifier(s) 110. Alternatively, such a Web browser selection module can obtain both the browser type identifier(s) 112 and the version identifier(s) 110 for Web page 104, and execute the identified version of the identified Web browser type.

Web browser 102 can obtain version identifier 110 and browser type identifier 112 for Web page 104 in different manners. In one or more embodiments, version selection module 120 accesses version identifier 110 and browser type identifier 112 from Web page 104 after Web page 104 is obtained by computing device 100 (e.g., from a server over the Internet). Alternatively, identifiers 110 and 112 can be obtained before Web page 104 is obtained, with a server hosting Web page 104 retrieving identifiers 110 and 112 from Web page 104 and sending identifiers 110 and 112 to computing device 100 before sending Web page 104. For example, a HyperText Transport Protocol (HTTP) request for Web page 104 can be made by Web browser 102 (or another component or module of computing device 100) to a server hosting Web page 104. In response to the HTTP request, an HTTP response including identifiers 110 and 112 can be returned. As identifiers 110 and 112 are included in, and retrieved from, the Web page, the version of the Web browser type used to display the Web page is thus based on the Web page itself.

Additionally, in the example of FIG. 1 Web page 104 is illustrated as including identifiers 110 and 112. In alternate embodiments, a server hosting Web page 104 or another device can maintain identifiers 110 and 112 for each of one or more Web pages and send those maintained identifiers 110 and 112 to computing device 100. This allows the server or other device to maintain identifiers 110 and 112 and alleviates Web page 104 from the responsibility of including identifiers 110 and 112. The server can send identifiers 110 and 112 for Web page 104 to computing device 100 separately from Web page 104 (e.g., as part of an HTTP response to an HTTP request for Web page 104), or alternatively with Web page 104. Although identifiers 110 and 112 need not be included in Web page 104 for such alternate embodiments, the version of the Web browser type used to display the Web page is still based on the Web page itself because the identifiers 110 and 112 indicate the version of the Web browser type that is supported by the Web page.

It should be noted that conflicts can arise where a server maintains browser type and version identifiers for Web page 104 and Web page 104 also includes browser type and version identifiers. Such conflicts can be resolved in different manners. In one or more embodiments, the browser type and version identifiers in Web page 104 are used and the browser type and version identifiers maintained by the server are ignored. Alternatively, such conflicts can be resolved in other manners, such as using the browser type and version identifiers maintained by the server rather than those in the Web page, making a selection based on the a particular identifier (e.g., favoring a particular Web browser type and/or version), and so forth.

Browser type identifier 112 and version identifier 110 can be implemented in any of a variety of different manners. In one or more embodiments, identifiers 110 and 112 are implemented using a mechanism designed to hold comments or meta data. Such a mechanism prevents older versions of Web browsers that do not support the Web page based program versioning discussed herein (and thus do not include a version selection module 120 as discussed herein) from being adversely affected by the inclusion of identifiers 110 and 112 in the Web pages. For example, for Web pages using the HyperText Markup Language (HTML), identifiers 110 and 112 can be included in one or more meta tags or comment tags. Web browsers that support the Web page based program versioning discussed herein can access and use these meta tags or comment tags, while Web browsers that do not support the Web page based program versioning discussed herein will ignore these meta tags or comment tags.

In one or more embodiments, identifiers 110 and 112 are included in Web page 104 using a meta tag having the following format:

<meta name="uaCompatible" scheme="type" content="version"> where the name portion has a value "uaCompatible" that identifies the meta tag as including identifiers 110 and 112, the scheme portion has a value type that identifies the Web browser type (which is browser type identifier 112), and the content portion has a value version that identifies the corresponding version (which is version identifier 110). Thus, this single meta tag identifies a particular Web browser type and corresponding version that is supported by Web page 104. Multiple such meta tags can be included in Web page 104 to identify multiple different Web browser types and corresponding versions that are supported by Web page 104.

It is to be appreciated that this meta tag example format is only an example, and that any of a variety of different syntaxes and/or formats can be used to include identifiers 110 and 112 in Web page 104. For example, HTML tags other than meta tags could be used, different names other than "uaCompatible" could be used, different labels or formats could be used to specify the Web browser type and/or corresponding version, and so forth. Additionally, any of a variety of different syntaxes and/or formats can be used by a server to maintain identifiers 110 and 112 for Web page 104.

Web page 104 can optionally include one or more programs that can be obtained from the same server or source as data 106, or alternatively from another server or source. These programs are oftentimes Web page scripts (e.g., script 108), although alternatively programs can be embedded in Web page 104 in different manners. Script 108 includes one or more instructions that are executed by Web browser 102 when displaying or otherwise presenting Web page 104. Situations can arise where the instructions that are executed as script 108 vary based on the particular Web browser type and/or Web browser version. In other words, script 108 can include different instructions for different Web browser types and/or Web browser versions.

Accordingly, in one or more embodiments script 108 determines which type of Web browser and which version of the Web browser has been selected to display the Web page. Script 108 makes this determination by requesting, from web browser 102 (e.g., version selection module 120) an identification of the particular web browser type and version that was selected by module 120. The request can be a request to identify the particular Web browser and corresponding version, and an identifier(s) of the particular Web browser and corresponding version selected to display the Web page is returned to the requesting script. Alternatively, the request can be a request of whether a particular Web browser and corresponding version has been selected to display the Web page, and a true or false indication (e.g., "True" or "False" values, "yes" or "no" values, etc.) is returned to the script as the response to the request. Multiple such requests can be made by the script to determine the particular Web browser type and corresponding version that has been selected to display the Web page.

Once the particular Web browser type and corresponding version that has been selected to display the Web page is known, script 108 (or other program included in Web page 104) executes the appropriate instructions for that particular Web browser type and corresponding version. As the particular Web browser type and corresponding version that has been selected to display the Web page is based on the Web page itself, it can be seen that the particular instructions executed as script 108 are also based on the Web page itself. These different instructions in script 108 can also be different versions of script 108. For example, script 108 can include multiple versions (analogous to the multiple versions 116 of Web browser 102), and a particular one of those multiple versions can be selected based at least in part on which version of the Web browser has been selected to display the Web page.

In one or more embodiments, an isCompatible method is defined to support such requests by a script or other program to determine which version of the Web browser has been selected to display the Web page. The isCompatible method is supported by Web browser 102 (e.g., version selection module 120) and is invoked by script 108 to determine the particular Web browser type and Web browser version that has been selected to display Web page 104. An example of the isCompatible method is defined as follows:

[bool=] document.isCompatible(sMode)

where bool is a Boolean value that is the result of the method (indicating whether the identified Web browser type and version has been selected to display Web page 104), document is an identifier of the particular Web page 104, and sMode is a string value that identifies a particular Web browser type and a particular corresponding version. The isCompatible method can be invoked multiple times by script 108 for a particular Web page 104, each time identifying a different Web browser type and version combination. It is to be appreciated that this isCompatible method is only an example method, and that other formats and syntaxes can be used for an isCompatible method.

In one or more embodiments, an object model representing the different Web browser types and corresponding versions that are supported by Web page 104 is generated. This object model can be generated by web browser 102 (e.g., version selection module 120) or alternatively another component or module of computing device 100. The object model includes multiple objects each representing a Web browser type and corresponding version supported by Web page 104. Multiple ones of these objects can be grouped together into a collection.

In one or more embodiments, a compatibleinfo object is defined to describe a Web browser type and corresponding version supported by Web page 104. A different compatibleinfo object is generated for each browser type identifier 112 and corresponding version identifier 110 supported by (e.g., included in) Web page 104. An example of the compatibleinfo object is defined to include two properties: a browserType property and a version property. The browserType property stores an identifier of the particular Web browser type (e.g., as retrieved from the scheme portion of a uaCompatible meta tag discussed above). The version property stores an identifier of the particular version of the Web browser type (e.g., as retrieved from the content portion of a uaCompatible meta tag discussed above). It is to be appreciated that this compatibleinfo object is only an example, and that other formats and syntaxes can be used for a compatibleinfo object.

Additionally, in one or more embodiments a compatible collection object is defined to describe a collection or grouping of Web browser types and corresponding versions supported by Web page 104. The compatible collection object includes one or more elements, each element corresponding to one or more Web browser type(s) and corresponding version(s) supported by Web page 104. An element can be, for example, a compatibleinfo object discussed above. Alternatively, an element can itself be a compatible collection object. For example, a particular collection can itself include multiple collections each of which corresponds to a particular Web browser type, and the elements within the collection for a particular Web browser type can include identifier(s) of particular version(s).

An example of the compatible collection object is defined as:

[collAll=] document compatible
[oObject=] document.compatible(vIndex)

where document is an identifier of the particular Web page 104, collAll is an array of elements (e.g., compatibleinfo objects) that is contained by the compatible collection object, vIndex is an integer that specifies a particular element or collection to retrieve, and oObject is a particular element or collection of elements that is identified by the vIndex value. The compatible collection object is defined to include a length property that stores an identifier of a number of elements that are in the collection. The compatible collection object is also defined to include an item method that retrieves an identified element from the collection. It is to be appreciated that this compatible collection object is only an example, and that other formats and syntaxes can be used for a compatible collection object.

Figure 2:
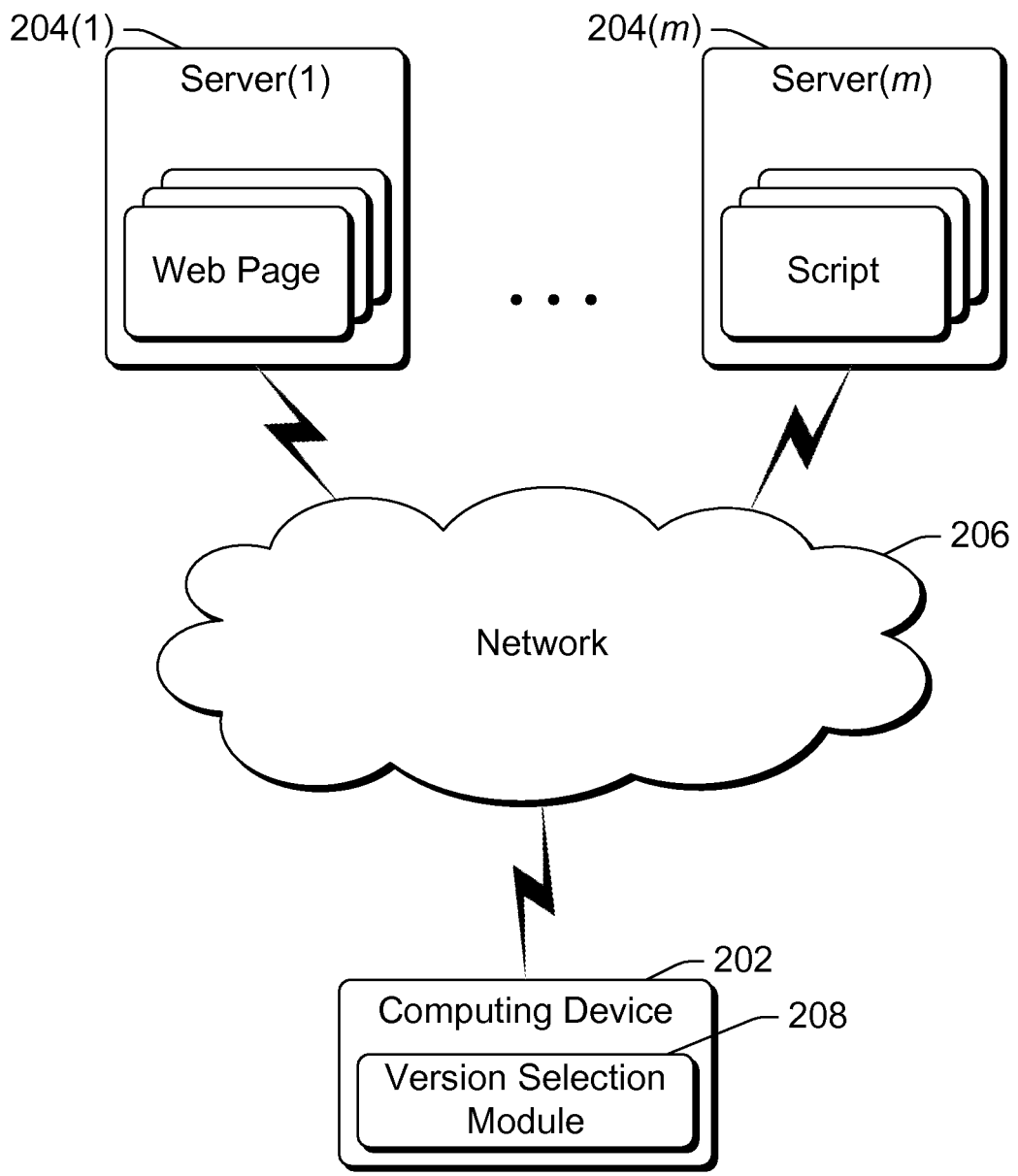
FIG. 2 illustrates an example system in which the Web page based program versioning can be used in accordance with one or more embodiments.

FIG. 2 illustrates an example system 200 in which the Web page based program versioning can be used in accordance with one or more embodiments. System 200 includes a computing device 202 that can communicate with one or more (m) servers 204 via a network 206. Network 206 can be any of a variety of networks, including the Internet, a local area network (LAN), a wide area network (WAN), combinations thereof, and so forth. Servers 204 can be any of a variety of different computing devices, one or more of which is a Web server hosting Web pages that can be retrieved and displayed by a Web browser of computing device 202. Additionally, one or more servers 204 is a Web server hosting Web page scripts or other programs that can be retrieved and executed by a Web browser of computing device 202 as part of displaying a Web page that is hosted by the same server 204 or alternatively hosted by a different server.

Computing device 202 can be any of a variety of different computing devices, such as computing device 100 of FIG. 1. Computing device 202 includes a version selection module 208. Version selection module 208 selects a particular Web browser type and corresponding version to be used to display individual Web pages as based by those individual Web pages as discussed herein. Version selection module 208 can be, for example, version selection module 120 of FIG. 1.

Figure 3:
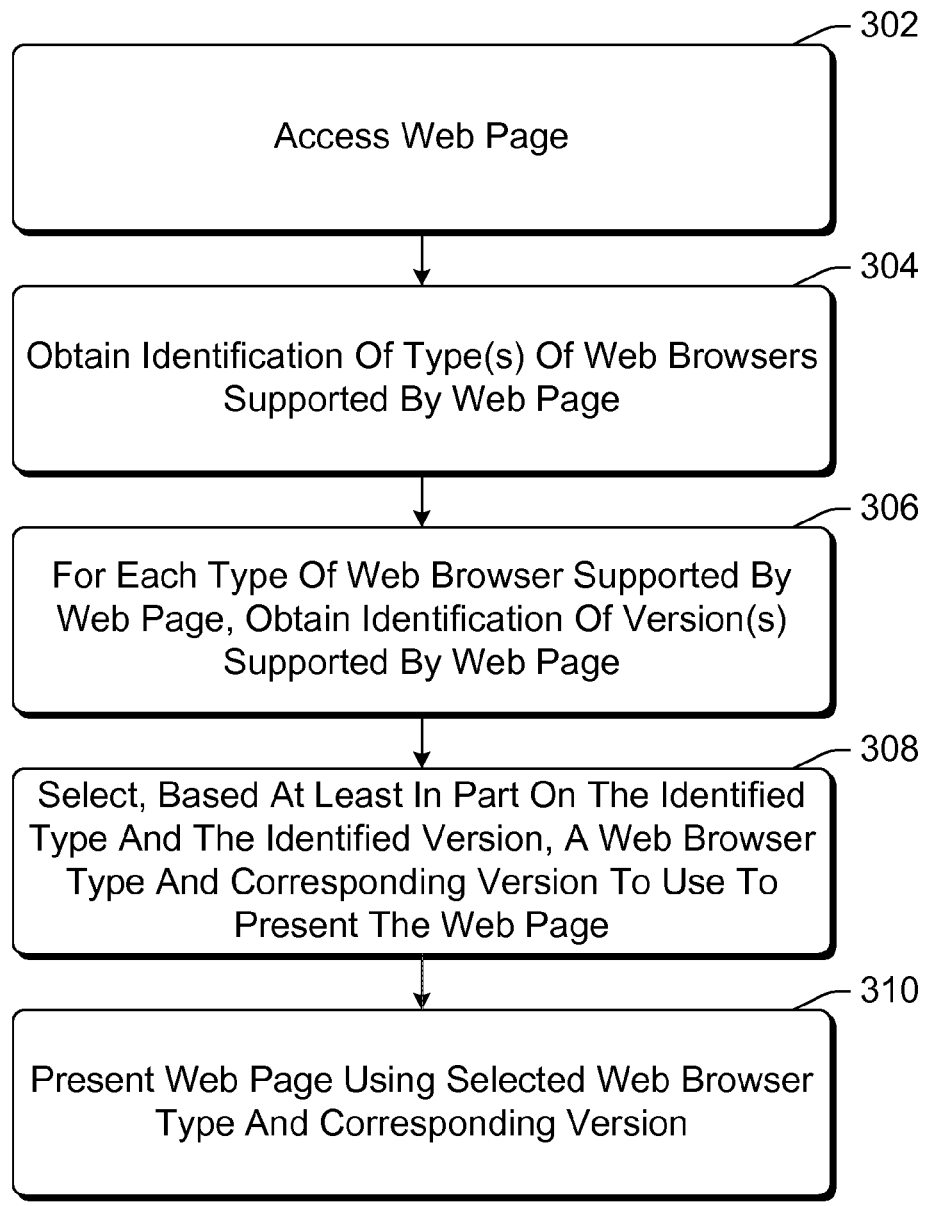
FIG. 3 is a flowchart illustrating an example process for Web page based program versioning in accordance with one or more embodiments.

FIG. 3 is a flowchart illustrating an example process 300 for Web page based program versioning in accordance with one or more embodiments. Process 300 is carried out by a device, such as device 100 of FIG. 1, and can be implemented in software, firmware, hardware, or combinations thereof.

Initially, a Web page is accessed (act 302). The Web page is accessed locally by the device and can be obtained from any of a variety of different sources. For example, the Web page can be obtained from a server via the Internet, from a local cache of the device, from another device operating on a same LAN as the device, from a proxy server or other intermediary cache, and so forth. Regardless of the source of the Web page, the Web page is stored locally at the device at least temporarily so that the Web page can be displayed or otherwise presented by the device.

An identification of one or more types of web browsers that are supported by the Web page are obtained (act 304). Additionally, for each type of Web browser supported by the Web page, an identification of one or more versions of the Web browser type that are supported by the Web page are obtained (act 306). As discussed above, these identifications in acts 304 and 306 can be included in the Web page itself, such as by using meta tags. These identifications in acts 304 and 306 can also be received from a server maintaining the identifications separately from the Web page as discussed above. In one or more embodiments, these Web browser type and corresponding version identifications can be included as objects in an object model as discussed above.

A particular Web browser type and corresponding version to use to present the Web page is then selected (act 308). As discussed above, this selection is based at least in part on the identified type(s) and version(s) obtained in acts 304 and 306. For example, if the Web page includes a single version identifier for a particular web browser type, that single identified version of the particular Web browser is selected in act 308 even if other more recent versions of the particular Web browser are included on the device.

Various other situations can also arise in which a selection from multiple Web browser types and/or corresponding versions supported by a Web page is made. For example, a version identification obtained in act 306 may indicate that a most recent version of the Web browser type is to be used to present the Web page, in which case the most recent version of the Web browser type identified in act 304 is selected in act 308. By way of another example, the Web page may include identifiers of three different versions of a particular Web browser type, all three of which are included on the device. In such situations, the most recent of the three different versions is selected in act 308. By way of yet another example, the Web page may include identifiers of three different versions of a particular Web browser type but only two of the three different versions are included on the device. In such situations, the most recent of the two versions that are included on the device are selected in act 308.

Typically, a particular Web browser is executing on the device and that Web browser is thus only concerned with versions corresponding to that same Web browser type. The Web browser (e.g., a version selection module of the Web browser) thus selects in act 308 a particular version of that Web browser. Thus, identified versions of different types of Web browsers can be ignored by the Web browser. Alternatively, situations can arise where a different Web browser type is selected in act 308. For example, a set of rules or other criteria can be used to prioritize or rank Web browser types (and optionally corresponding versions). Using this ranking, a different Web browser type than a currently executing Web browser can be selected in act 308. In such situations, this different Web browser type is executed and accesses the Web page.

After the selection is made in act 308, the Web page is displayed and/or otherwise presented using the selected Web browser type and corresponding version (act 310). Web pages are typically displayed by a device, but can also be presented in other manners, such as playback of audio data.

Process 300 can be repeated for each Web page accessed by the device. Alternatively, process 300 can be performed for groups of Web pages. For example, each Web page in a particular domain can support the same Web browser type(s) and version(s), in which case process 300 is performed each time that particular domain is accessed but is not repeated when different Web pages within that particular domain are accessed. This domain-based grouping can be a default operation of the Web browser, or alternatively can be identified to the Web browser in different manners, such as including an identifier of the grouping in the Web page along with the browser type identifier and the version identifier.

Figure 4:
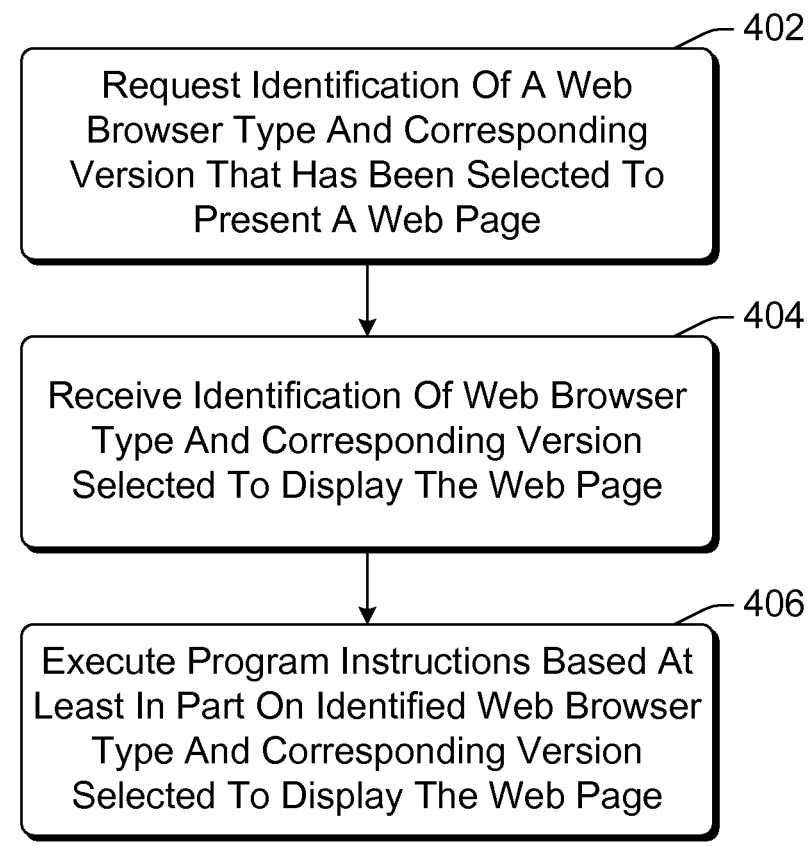
FIG. 4 is a flowchart illustrating another example process for Web page based program versioning in accordance with one or more embodiments.

FIG. 4 is a flowchart illustrating another example process 400 for Web page based program versioning in accordance with one or more embodiments. Process 400 is typically carried out by software or firmware program running on a device (e.g., device 100 of FIG. 1). In one or more embodiments, the program is a Web page script, such as script 108 of FIG. 1.

Initially, an identification of a Web browser type and corresponding version that has been selected to present a Web page is requested (act 402). This request is typically made of the Web browser presenting the Web page, although alternatively the request can be made of other components or modules. An identification of the Web browser type and corresponding version selected to display the Web page is then received (act 404). In one or more embodiment this request in act 402 is a single request for particular identifiers that are provided in the response of act 404. Alternatively, this request in act 402 can be a series of one or more requests that identify a particular Web browser type and corresponding version, and the response in act 404 is either a "True" value indicating that the particular Web browser type and corresponding version has been selected or a "False" value indicating that the particular Web browser type and corresponding version has not been selected.

The instructions of the program are then executed based at least in part on the identified Web browser and corresponding version selected to display the Web page (act 406). This execution in act 406 can include, for example, selecting a particular version of the program, executing different sets of instructions, executing instructions in different orders, varying parameters of instructions, and so forth.

Figure 5:
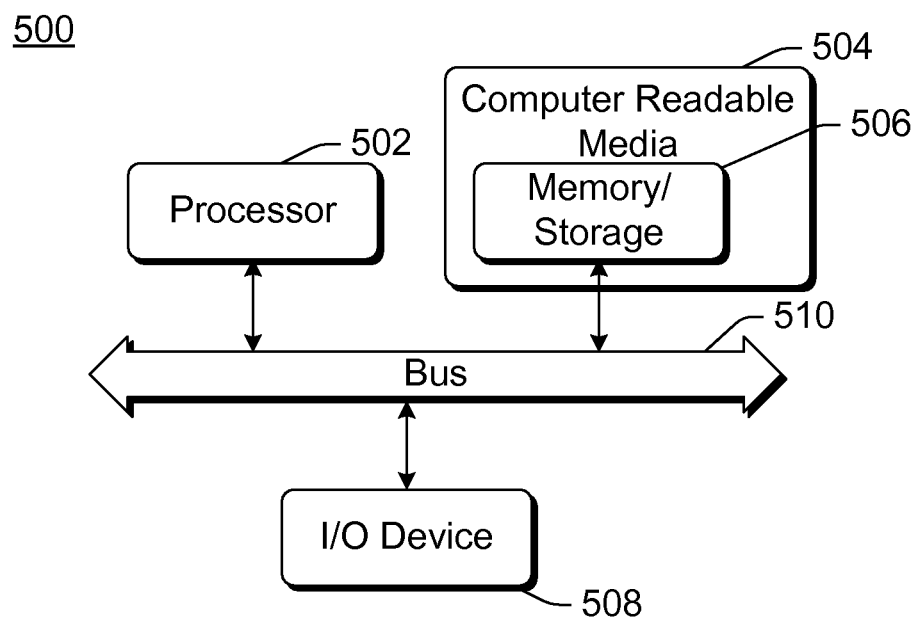
FIG. 5 illustrates an example computing device that can be configured to implement the Web page based program versioning in accordance with one or more embodiments.

FIG. 5 illustrates an example computing device 500 that can be configured to implement the Web page based program versioning in accordance with one or more embodiments. Computing device 500 can be, for example, a computing device 100 of FIG. 1, a computing device 202 of FIG. 2, a server 204 of FIG. 2, and so forth.

Computing device 500 includes one or more processors or processing units 502, one or more computer readable media 504 which can include one or more memory and/or storage components 506, one or more input/output (I/O) devices 508, and a bus 510 that allows the various components and devices to communicate with one another. Computer readable media 504 and/or I/O device(s) 508 can be included as part of, or alternatively may be coupled to, computing device 500. Bus 510 represents one or more of any of several types of bus structures, including a memory bus or memory controller, a peripheral bus, an accelerated graphics port, and a processor or local bus using any of a variety of bus architectures. Bus 510 can include wired and/or wireless buses.

Memory/storage component 506 represents one or more computer storage media. Component 506 can include volatile media (such as random access memory (RAM)) and/or non-volatile media (such as read only memory (ROM), Flash memory, optical disks, magnetic disks, and so forth). Component 506 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by processing unit(s) 502. It is to be appreciated that different instructions can be stored in different components of computing device 500, such as in a processing unit 502, in various cache memories of a processing unit 502, in other cache memories of device 500 (not shown), on other computer readable media, and so forth. Additionally, it is to be appreciated that the location where instructions are stored in computing device 500 can change over time.

One or more input/output devices 508 allow a user to enter commands and information to computing device 500, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Additionally, it should be noted that in one or more embodiments the techniques discussed herein can be implemented in hardware. For example, one or more logic circuits, application-specific integrated circuits (ASICs), programmable logic devices (PLDs), and so forth can be created and/or configured to implement the techniques discussed herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device comprising:
   one or more processors; and
   one or more computer readable memory devices having stored thereon multiple instructions that, when executed by the one or more processors, cause the one or more processors to perform operations comprising:
     accessing a Web page;
     obtaining, using a Web browser selection module, an identification of one type of multiple types of Web browsers that the Web page supports, the identification of the one type of Web browser being obtained from a server separately from the Web page;
     after obtaining the identification of the one type of Web browser, obtaining an identification of each version of multiple versions of the identified one type of Web browser that the Web page supports, the multiple versions of the identified one type of Web browser including:
       a first subset of the multiple versions of the one type of Web browser identified as being supported by the Web page and obtained from a server separately from the Web page; and
       a second subset of the multiple versions of the one type of Web browser identified as being supported by the Web page and obtained from the Web page;
     automatically selecting, using a version selection module, one version of the multiple versions of the identified one type of Web browser that the Web page supports, the one version being selected by at least ignoring the first subset and selecting from the second subset based on conflicts between the first subset and the second subset; and
     presenting the Web page using the selected one version of the identified one type of Web browser.

2. A computing device as recited in claim 1, wherein the multiple instructions comprise a Web browser.

3. A computing device as recited in claim 1, wherein the selected one version of the identified one type of Web browser comprises a different Web browser type than a currently executing web browser type.

4. A computing device as recited in claim 1, wherein obtaining the identification of the one type of multiple types of Web browsers and to obtaining the identification of each version of the multiple versions is includes:
   obtaining identifications of multiple types of Web browsers and corresponding Web browser versions that the Web page supports;
   selecting, from all versions of all Web browser types that the Web page supports, one Web browser version of one Web browser type; and
   using the selected one Web browser version of the one Web browser type as the selected one version of the identified one type of Web browser.

5. A computing device as recited in claim 1, wherein the identification of each version of the multiple versions comprises an identification that a most recent version of the identified type of Web browser that is available on the device is the selected one version.

6. A computing device as recited in claim 1, wherein the operations further comprise generating a compatible collection object having multiple elements, each of the multiple elements identifying a particular type of Web browser and a corresponding particular version of the Web browser that the Web page supports.

7. A computing device as recited in claim 1, wherein the operations further comprise:
   receiving, from a script included in the Web page, a request for an identification of the identified one type of Web browser and the selected one version; and
   returning, to the script, the identification of the identified one type of Web browser and the selected one version.

8. A computing device as recited in claim 7, wherein returning the identification comprises returning both a Web browser type identifier of the one type of Web browser and a version identifier of the selected one version.

9. A computing device as recited in claim 7, wherein returning the identification comprises returning a true indication if a Web browser type and corresponding version identified in the request is the identified one type of Web browser and the selected one version, and otherwise to return a false indication.

10. A computing device as recited in claim 1, wherein the operations further comprise, after the identification of the one type and identification of each version of the multiple versions are obtained, beginning execution of the selected one version of the identified one type of Web browser.

11. A method comprising:
    identifying which ones of multiple Web browser versions a Web page supports, the multiple Web browser versions being multiple versions of one or more types of Web browsers and including:
      a first subset of the multiple Web browser versions identified as being supported by the Web page and obtained from a server separately from the Web page; and
      a second subset of the multiple Web browser versions identified as being supported by the web page and obtained from the Web page;
    selecting, based at least in part on which ones of the multiple Web browser versions the Web page supports, a version of a Web browser type, the version of the Web browser type being selected by at least ignoring the first subset of Web browser versions and selecting from the second subset of Web browser versions based on conflicts between the first subset and the second subset; and
    displaying the Web page using the selected version of the Web browser type, the selected version of the Web browser type being a different Web browser type than a currently executing Web browser type.

12. A method as recited in claim 11, the identifying comprising accessing one or more meta tags included in the Web page, each meta tag including an identifier of a Web browser type and corresponding version that the Web page supports.

13. A method as recited in claim 11, the selecting comprising selecting a most recent version of a Web browser type that is both identified in the Web page and that is included as a version of the Web browser on a device implementing the method.

14. A method as recited in claim 11, further comprising:
  receiving, from a program included in the Web page, a request for an identification of the selected version of the Web browser type; and
  returning, to the program, the identification of the selected version of the Web browser type.

15. A method as recited in claim 14, the program comprising a Web page script obtained from a different server than a server from which the Web page is obtained.

16. A computing device comprising:
  one or more processors; and
  one or more computer readable memory devices having stored thereon a program that, when executed by the one or more processors, causes the one or more processors to perform operations comprising:
    identifying which ones of multiple Web browser versions a Web page supports, the multiple Web browser versions being multiple versions of one or more types of Web browsers and including:
      a first subset of the multiple Web browser versions identified as being supported by the Web page and obtained from a server separately from the Web page; and
      a second subset of the multiple Web browser versions identified as being supported by the web page and obtained from the Web page;
    selecting, based at least in part on which ones of the multiple Web browser versions the Web page supports, a version of a Web browser type, the version of the Web browser type being selected by at least ignoring the first subset of Web browser versions and selecting from the second subset of Web browser versions based on conflicts between the first subset and the second subset; and
    displaying the Web page using the selected version of the Web browser type, the selected version of the Web browser type being a different Web browser type than a currently executing Web browser type.

17. A computing device as recited in claim 16, wherein the operations further comprise accessing one or more meta tags included in the Web page, each meta tag including an identifier of a Web browser type and corresponding version that the Web page supports.

18. A computing device as recited in claim 16, wherein the operations further comprise selecting a most recent version of a Web browser type that is both identified in the Web page and that is included as a version of the Web browser on a device implementing the method.

19. A computing device as recited in claim 16, wherein the operations further comprise:
  receiving, from a program included in the Web page, a request for an identification of the selected version of the Web browser type; and
  returning, to the program, the identification of the selected version of the Web browser type.

20. A computing device as recited in claim 19, wherein the program comprises a Web page script obtained from a different server than a server from which the Web page is obtained.

* * * * *